United States Patent [19]

Schindel

[11] Patent Number: 4,493,997

[45] Date of Patent: Jan. 15, 1985

[54] FIBER OPTIC SENSOR FOR SHAFT STATE

[75] Inventor: Arnold Schindel, Fairlawn, N.J.

[73] Assignee: The Singer Company, Little Falls, N.J.

[21] Appl. No.: 413,922

[22] Filed: Sep. 1, 1982

[51] Int. Cl.³ .................................. G01D 5/34
[52] U.S. Cl. .......................... 250/231 SE; 250/551
[58] Field of Search ............. 250/551, 231 SE, 237 G; 336/120; 340/347 P; 455/602; 350/96.1; 315/171–173, 155

[56] References Cited

U.S. PATENT DOCUMENTS

| | | | |
|---|---|---|---|
| 2,882,450 | 4/1959 | McCabe | 315/155 |
| 2,944,157 | 7/1960 | McAuslan et al. | 250/233 |
| 3,480,937 | 11/1969 | Robinson | 336/120 |
| 4,162,399 | 7/1979 | Hudson | 250/231 SE |
| 4,190,318 | 2/1980 | Upton, Jr. | 250/551 |
| 4,199,749 | 4/1980 | Richter | 340/347 P |
| 4,240,066 | 12/1980 | Lenox | 250/231 SE |
| 4,253,021 | 2/1981 | Ernst | 250/231 SE |
| 4,266,125 | 5/1981 | Epstein et al. | 250/231 SE |
| 4,342,025 | 7/1982 | Spalti et al. | 250/231 SE |
| 4,442,423 | 4/1984 | Urbanik | 250/231 SE |

*Primary Examiner*—David C. Nelms
*Assistant Examiner*—James Gatto
*Attorney, Agent, or Firm*—Morris Liss; T. W. Kennedy

[57] ABSTRACT

A shaft state sensor includes a rotating member having a miniaturized lamp mounted thereto. A rotary transformer is connected to the lamp and supplies it with power. A number of optic fibers are arranged in a circular configuration on a stationary member of the sensor. The center of the circular configuration is coaxial with the shaft of the rotating member. As the shaft turns, the lamp becomes sequentially aligned with each of the fibers thereby indicating changes in shaft position. The fibers are connected to an optical coupler which is in turn connected to an optical density discriminator for detecting when the light passing through a particular optic fiber exceeds the required threshold level. The output from the discriminator is optical and may travel over substantial cable distances to a computer location without the introduction of electrical noise so that shaft position or velocity may be computed.

2 Claims, 1 Drawing Figure

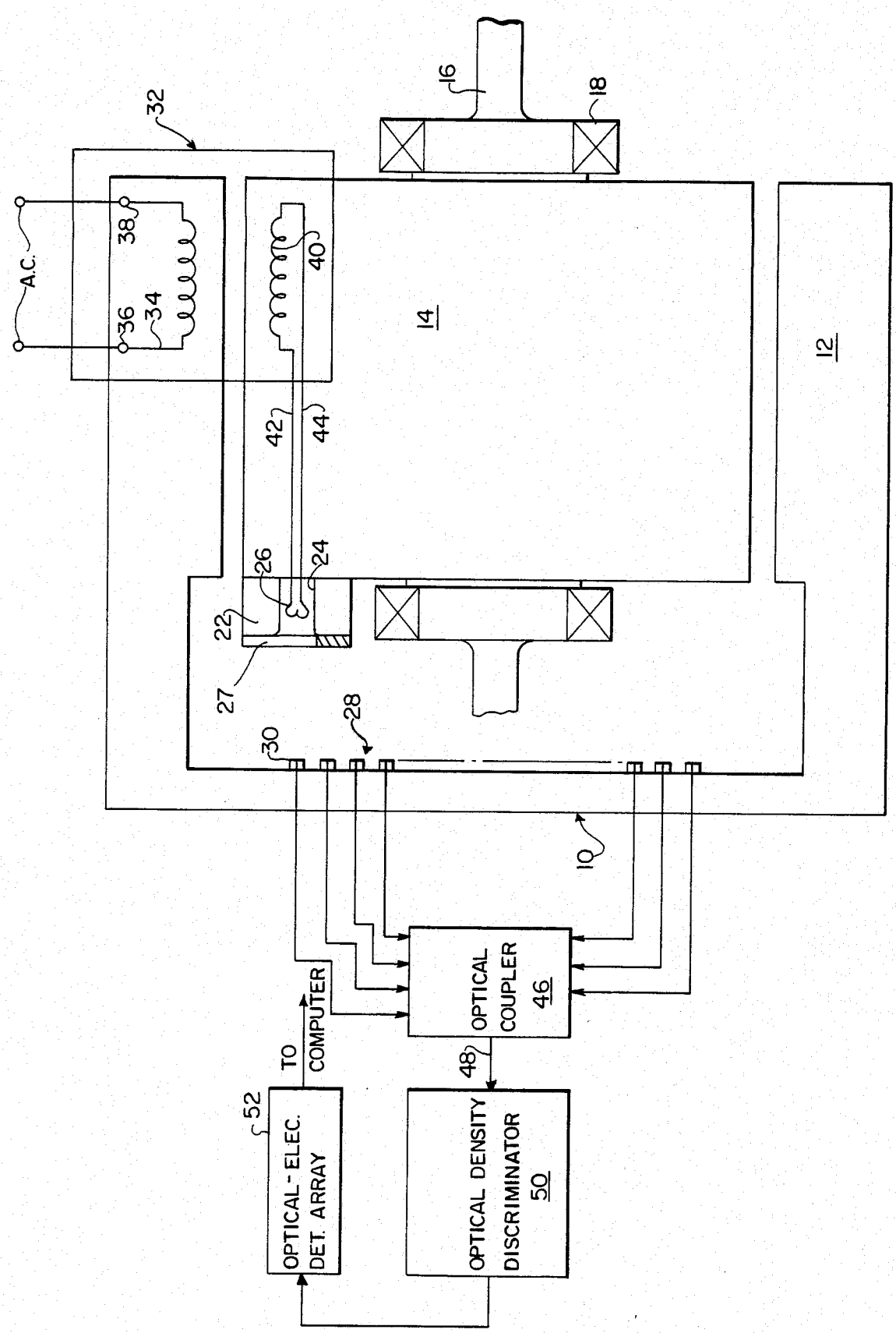

FIBER OPTIC SENSOR FOR SHAFT STATE

FIELD OF THE INVENTION

The present invention relates to shaft position sensors and more particularly to such a sensor utilizing fiber optics.

BRIEF DESCRIPTION OF THE PRIOR ART

Currently, a host of absolute position sensors are available on the market. These include rotary elements and are generally involved with electromechanical and electromagnetic devices, such as synchros and resolvers which involve inductive elements and flux linkage and coupling for transforming excitation to discrete positional information in terms of electrical amplitude and phase form. Current technology has progressed to the brushless type which obviates some of the adverse effects of noise and mechanical wear on the output data generated by such devices. Encoder devices are available which present absolute positional or incremental information (for external counting). These are operative in magnetic, optical or reluctance modes. These generally also generate electrical outputs which are effected by noise so that a resultant signal-to-noise ratio is less than optimum.

BRIEF DESCRIPTION OF THE PRESENT INVENTION

A shaft position sensor includes a rotating member having a miniaturized lamp mounted thereto. A rotary transformer is connected to the lamp and supplies it with power. A number of optic fibers are arranged in a circular configuration on a stationary member of the sensor. The center of the circular configuration is coaxial with the shaft of the rotating member. As the shaft turns, the lamp becomes sequentially aligned with each of the fibers thereby indicating changes in shaft position. The fibers are connected to an optical coupler which is in turn connected to an optical density discriminator for detecting when the light passing through a particular optic fiber exceeds the required threshold level. The output from the discriminator is optical and may travel over substantial cable distances to a computer location without the introduction of electrical noise.

By virtue of the present inventive structure, a fully optical sensor is available providing positional information which may be coupled by means of fiber optic transmission elements to an external optical electrical converter at a host computer which processes such information with the benefit of accurate, discrete and noiseless data transmission.

The above-mentioned objects and advantages of the present invention will be more clearly understood when considered in conjunction with the accompanying drawings, in which:

BRIEF DESCRIPTION OF THE FIGURE

The FIGURE is a schematic cross-sectional illustration of the present fiber optic shaft position sensor.

DETAILED DESCRIPTION OF THE INVENTION

Referring to the FIGURE, reference numeral 10 generally indicates the shaft position sensor of the invention. It primarily consists of a stationary member 12 which encloses a rotating member 14. The rotating member is mounted on an axial shaft 16 appropriately supported by bearings 18.

The illustrated left face of the rotating member 14 has a lamp enclosure 22 mounted thereto. The enclosure has a cavity 24 formed therein for receiving a "grain of wheat" lamp 26 therein. A slit 27 is formed outwardly from cavity 24 along a direction in perpendicular spaced relation to the axis of shaft 16.

A plurality of optic fibers, generally indicated by reference numeral 28, are arranged in a circular configuration and are mounted to the stationary member 12 along a surface opposite the face of the rotating member 14 to which lamp enclosure 22 is mounted. The center of the fiber optic circular configuration is coincident with the axis of shaft 16. Further, each of the fibers is precisely positioned at a radius R from the axis of shaft 16 so that lamp slit 27 is perfectly aligned with each fiber as the rotational member undergoes 360 degrees of rotation. The alignment between lamp, slit and optic fiber is shown in the FIGURE for the case of optic fiber 30.

A rotary transformer generally indicated by reference numeral 32 provides brushless electrical power feed to lamp 26. The transformer includes a primary winding 34 having input taps 36 and 38 that are connected to a source of AC voltage. The secondary winding 40 is connected across the leads 42 and 44 of lamp 26.

As indicated, each of the optic fibers terminates in an optical coupler 46 which is of a conventional type. The purpose of this coupler is to provide connection to an optical cable bundle 48 which in turn carries the light signals from the optic fibers 28, in optical form, to the density discriminator 50 which is also of conventional design. At the density discriminator, light density value is examined and the signal from the fiber is enhanced to pass through only one or two fibers whose light density comprises the closest analog of the positional information. This optical signal, virtually noise free, excites a conventional optical/electrical detector array 52 which is located at a site removed from sensor 10 and typically at the location of a host computer or controller.

A further resolution of position could be enhanced by a second circle of non-illustrated fibers which are identical to and immediately outside the first circle of fibers 28. A given fiber of the second circle would be angularly offset from adjacent fibers in the first circle of fibers 28. This would increase the count resolution by an additional factor of "2".

The present invention may be used as a positional sensor or as an incremental position sensor. This is achieved by an appropriate coupled decoding apparatus which does not, per se, form part of the present invention. Suitable counting of peak light element transmission may be used to collect position change as a function of reference position. The optical density discriminator 50 selects one fiber only per count.

In the event shaft velocity sensing is desired, the detector array 52 is of the conventional incremental type which generates stepping pulses. These pulses may then be differentiated in a computer over a time base, to compute velocity.

Accordingly, as will be appreciated from the above review of the invention, a fiber optic shaft position sensor is presented which generates a completely optical output from which noiseless transmission may be obtained for introduction at a remote site to a host computer.

It should be understood that the invention is not limited to the exact details of construction shown and described herein for obvious modifications will occur to persons skilled in the art.

I claim:

1. An optical shaft state sensor comprising:
   an input shaft;
   a rotating member connected to the input shaft;
   a stationary member located adjacent the rotating member;
   a light source mounted to a surface of the rotating member at a distance R from the axis of the shaft;
   at least one plurality of optic fibers arranged in a generally circular pattern on a stationary member surface confronting the rotating member surface to which the light source is mounted, each fiber located at a distance R from the axis of the shaft so that the light source is in selective optical alignment with the fibers as the shaft rotates;
   means for discriminating which of the fibers is illuminated by the light source at any point in time;
   means including an optical coupler and an optical cable bundle for optically coupling the optic fibers to the discriminating means;
   a rotary transformer having a primary winding mounted to the stationary member and a secondary winding mounted to the rotating member;
   means connecting the secondary winding to the light source;
   AC input terminals connected to the primary winding for providing power for the light source;
   detecting means including a detector array of a computer and located at a point remote from the discriminating means and having an optical input therefrom for converting data at the optical input to corresponding electrical data; and
   slit means located adjacent the light source for producing a narrow light beam for impinging upon the optic fibers.

2. The structure set forth in claim 1 wherein the light source is a "grain of wheat" lamp.

* * * * *